United States Patent [19]
Hirsch

[11] Patent Number: 6,070,816
[45] Date of Patent: Jun. 6, 2000

[54] STRAW CHOPPER

[75] Inventor: Walter Hirsch, Kirkel/Limbach, Germany

[73] Assignee: Deere & Company, Moline, Ill.

[21] Appl. No.: 09/201,108

[22] Filed: Nov. 30, 1998

[30] Foreign Application Priority Data

Dec. 2, 1997 [DE] Germany .......................... 197 53 486

[51] Int. Cl.⁷ .................................................. B02C 21/02
[52] U.S. Cl. .................................. 241/101.742; 241/194; 241/243; 241/605
[58] Field of Search .................................... 241/194, 243, 241/605, 101.742, 190; 56/16.4 R

[56] References Cited

U.S. PATENT DOCUMENTS 4,526,180  7/1985  Scott et al. .
5,556,042  9/1996  Roberg ................................ 241/101.76
5,803,375  9/1998  Hartwig .................................... 241/28

FOREIGN PATENT DOCUMENTS 0 702 892 A1  3/1996  European Pat. Off. .
25 29 019    1/1977  Germany .
44 31 802 A1 3/1996  Germany .

Primary Examiner—John M. Husar

[57] ABSTRACT

A straw chopper arrangement for an agricultural combine wherein the chopper is provided two vertically arranged rotors. The rotors are provided with a number of circumferentially spaced radially extending impeller blades. The outer ends of the impeller blades are provided with pivotally mounted flails. The flails are vertically spaced from one another. The straw chopper arrangement is also provided with a chopper housing for receiving the rotors. The housing having at least two walls that are provided with inwardly extending shear bars which are located in the vertical space defined by vertically adjacent flails.

9 Claims, 2 Drawing Sheets

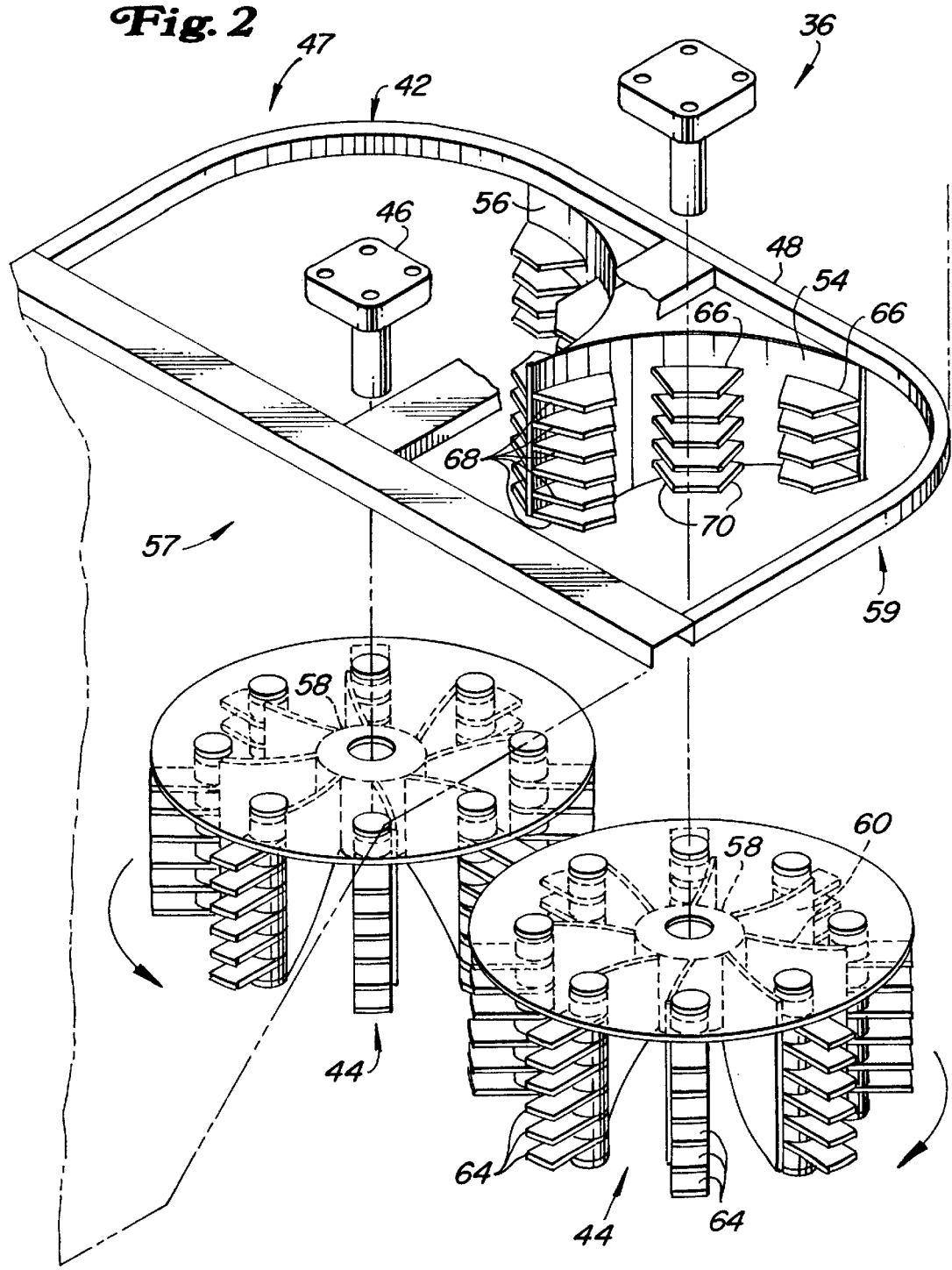

STRAW CHOPPER

BACKGROUND OF THE INVENTION

1. Field of the Invention

The invention is directed to a straw chopper arrangement for a combine having a rotor with an approximately vertical axis of rotation. The rotor is provided with at least one impeller blade extending radially outward from the hub. Flails are pivotally mounted to the outermost end of the impeller blade from the hub. The flails on each impeller blade are vertically spaced apart from one another. The flails interact with counter knives or shear bars attached to the chopper housing where the shear bars are located in the intervening spaces between the flails.

2. Description of the Prior Art

Straw chopper arrangements are applied to agricultural combines and cut the straw remaining after the grain has been threshed and separated from the straw. Known chopper arrangements frequently consist of a chopper unit and a following distribution arrangement. The "Lexion" combine advertisement of the CLAAS company, printer's notice 7/96 200/190.406.8, shows a chopper unit with horizontal axis of rotation that is followed by two distribution blowers with vertical axes of rotation and separate outlet funnels. Since this chopper unit requires a large amount of installation space, it hinders access to the interior of the combine, in particular the sieves. In order to gain access to the sieves and to utilize an attached implement, the outlet funnels of the distribution blowers must be pivoted out of the way.

DE-OS-25-29 019 shows a straw chopper whose straw cutting tool contains one or more knife-carrying shafts having axes of rotation that are arranged vertically or approximately vertically. Fixed shear bars are arranged between the knife-carrying shafts. At the lower end of the knife-carrying shafts centrifugal disks with impeller blades are provided. The straw is conducted to the straw cutting tool over a slide. If the slide is pivoted aside the operation of the straw chopper is stopped and the straw is ejected directly without chopping. With this arrangement the operations of chopping and distribution cannot be selected independently of each other.

EP-A1-0 702 892 shows a straw chopper in which a chopper arrangement and a distributing arrangement are integrated into a single tool unit in a rotor housing. The tool unit forms a cutter and an impeller arrangement, so that the mixture of straw and chaff falling into the rotor housing is chopped and simultaneously conveyed in the direction of an output duct. The mixture of straw and chaff is supplied to the tool unit through a transfer funnel. Here too, the straw may be either chopped and distributed or it may be delivered without being chopped.

SUMMARY

It is an object of the present invention to provide a straw chopper with a more favorable crop supply having a more compact design that provides access to various regions of the harvesting machine.

In the crop supply side of the housing of the straw chopper arrangement an opening is provided through which the crop to be chopped is conducted tangentially to the rotor. Thereby the straw coming from the shakers or from the rotor of the axial flow combine as well as the chaff delivered by the sieves can reach the chopper arrangement. As a result of the tangential supply arrangement no supplementary supply arrangement is required on the upper side of the straw chopper. Therefore the chopper arrangement requires a smaller space and represents no unnecessary obstacles.

An opening as large as possible, that extends to great advantage over the entire supply side of the housing, further improves the supply of crop into the straw chopper arrangement, so that no supplementary conveyor arrangement is required.

In order to assure that the straw chopper arrangement operates effectively over the entire width of the harvesting machine, two separate rotors are provided in the chopper housing.

Uniform distribution of the chopped crop or of the uncut straw to be ejected is attained if the two rotors are arranged as mirror images with respect to an imaginary longitudinal axis of the straw chopper arrangement and rotate in opposite directions. The straw or the chopped crop is then accelerated to both sides of the straw chopper arrangement and is ejected uniformly over the entire width of the harvesting machine.

If the shear bars are provided on the walls of the chopper housing between the rotors, the shear bars for both rotors are accessible in a common region.

The ejection performance can be improved if the housing walls follow the contour of the rotors and partially enclose the rotors. Here the walls may be configured, for example, as curved sheet metal parts. In order to control the direction of ejection of the chopper arrangement various adjustment possibilities with regard to their position or their extent can be applied to the walls. For this purpose the walls may be configured as multiple parts, where the various parts are connected in the usual manner by elongated hole/screw connections. Thereby varied distribution patterns are possible within the adjustment range provided by the elongated holes.

The ejection is influenced positively if the walls are provided with cutouts from the underside of the rear side of the chopper housing. Thereby the available ejection area is enlarged and a crop distribution is possible even in a central region of the straw chopper arrangement.

In order to make possible a simple modification of the straw chopper arrangement for long straw deposit, the shear bars may be provided in the walls so that they can be loosened and removed. In order to make the removal simple and rapid, the shear bars are attached to rails by means of which they can be inserted in groups into slots in the walls.

If the flails are configured as knives they interact with the shear bars during the chopping of the straw, whereby the straw is not torn but is cut into uniform pieces, which reduces the power requirement.

Impeller blades are attached with one end to the hub of the rotor and the other end is provided with pivotable flails. The impeller blades operate as blower blades when the rotor is rotating. Thereby a negative pressure is generated in the interior of the chopper housing, which draws the straw coming from the shakers, or the rotor or rotors, or the chaff delivered by the sieves into the interior of the chopper housing, without requiring supplementary conveyor arrangements. The chopped crop contained in the interior of the chopper housing is accelerated by the rotating impeller blades and is ejected through at the least partially open rear side of the straw chopper arrangement.

In order to control the direction of ejection of crop material from the straw chopper arrangement and/or in order to optimize the crop supply, the chopper arrangement is pivotally attached to the combine. The straw chopper arrangement can be made to completely pivot aside, if neither chopping nor distribution of the straw is to be performed.

However, the operation of the straw chopper arrangement can also be stopped by closing the cutouts on the supply side of the chopper arrangement, for example, by one or more pivoted sheet metal doors.

BRIEF DESCRIPTION OF THE DRAWINGS

FIG. 2 shows a perspective exploded view of the straw chopper arrangement of the present invention.

DETAILED DESCRIPTION

Figure 1:
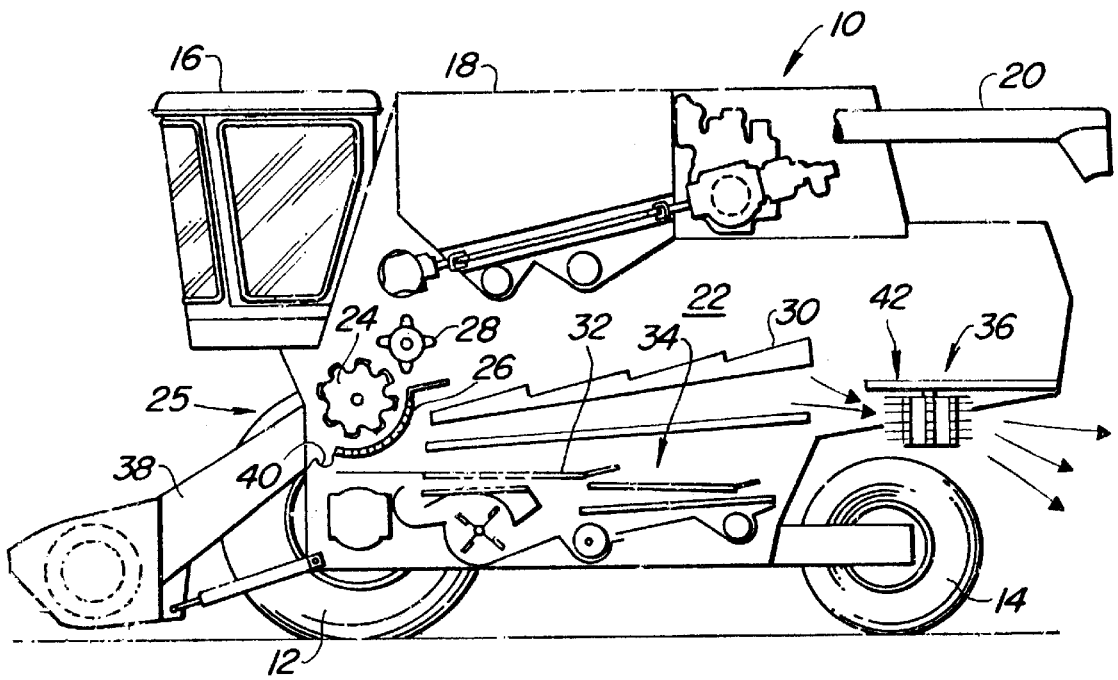
FIG. 1 is a side view of a combine having a straw chopper arrangement of the present invention.
Figure 3:
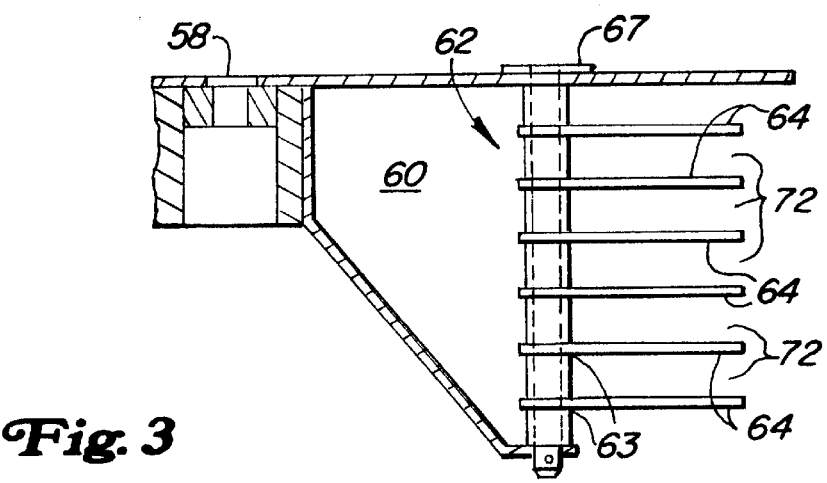
FIG. 3 shows a side view of an impeller blade of the straw chopper arrangement with flails connected in joints, free to oscillate.

A harvesting machine 10 shown in FIG. 1 in the form of a combine is supported on front driven and rear steerable wheels 12, 14 and is provided with an operator's cab 16 from which it can be controlled by an operator. The operator's cab 16 is followed to the rear by a grain tank 18 that can deliver crop deposited in it to the outside through a discharge pipe 20. The grain tank 18 is supported on a frame 22. A standing or lying agricultural crop is harvested by harvesting platform 39 which directs the harvested crop to feederhouse 38. The feederhouse 38 in turn directs the harvested crop past a stone trap 40 to the threshing arrangement 25 which comprises a threshing cylinder 24, a concave 26 and a beater 28. Some of the grain and chaff threshed from the harvested crop material falls through the concave onto grain pan 32. The remaining threshed crop material is passed onto straw walkers 30. In place of shakers 30 the application of one or more axial separators is also possible. Grain and chaff from the separated by the straw walkers is also directed to grain pan 32. The chaff and grain on grain pan 32 is directed to sieves 34 for removing the chaff from the grain. The cleaned grain is then conveyed to the grain tank 18. The remaining crop material passing over the straw walkers are suctioned, chopped and deposited on the ground by a chopper arrangement 36, according to the invention, which is connected in joints to the harvesting machine 10 in a manner not shown.

The straw chopper arrangement 36 is pivotally connected to the frame 22 of the harvesting machine 10. The straw chopper arrangement comprises, as shown in FIG. 2, of a chopper housing 42, in which two rotors 44 are arranged. Both rotors 44 are rotated by two shafts 46. These rotors 44 can be driven by a belt drive, not shown, that is configured conventionally, at the upper side 47 of the chopper housing 42 through the shafts 46. It is also possible to provide a drive with an alternative configuration at an underside 59 of the chopper housing 42. The rotors 44 are transversely arranged alongside each other with respect to the direction of operation of the combine 10. An insert 50 extends from the upper side 47 of the chopper housing 42 downward in the otherwise open region of the rear side 48 of the chopper housing 42. This insert 50 consists of two walls 54, 56 that are curved in their configuration and that partially enclose the rotors 44 with a small gap from the rear side 48. The walls 54, 56 are connected to the upper side 47 of the chopper housing 42 in such a way that the angle enclosed by them can be varied and whereby the distance to the rotors 44 is also variable. Furthermore it is also possible to configure the walls 54, 56 in two or more parts each. The individual parts, not shown, of the walls 54, 56 can be shifted with respect to each other by means of elongated holes and screw fastenings, not shown, whereby the total extent of the walls 54, 56 can be varied.

The upper side 47 of the chopper housing 42 is closed. On the other hand a supply side 57 is completely open in the direction of the interior of the combine 10.

Each of the rotors 44 consist of a hub 58 on which several paddle-shaped impeller blades 60 are attached. The impeller blades are circumferentially spaced from one another and extend radially outward from the hub. The impeller blades are rigidly connected to a cover plate 61 of the rotors 44, in the illustrated embodiment. However, the blades do not have to be rigidly attached to the plate 61. On the radially outermost end 62 of the impeller blades 60 several flails 64 are arranged and spaced uniformly above one another. The flails 64 are preferably provided with cutting edges on both sides and are pivotally mounted to the impeller blades 60. On the ends 62 facing away from the hub 58 the impeller blades 60 are configured as eyelets. In the eyelet-shaped ends 62 horizontally spaced slots 63 are provided into which the flails 64 can be inserted. These are secured by retaining pins 67 that are inserted through the eyelet-shaped ends 62 and through the flails 64. The two rotors 44 are configured and arranged as mirror images to each other and with respect to an imaginary longitudinal axis of the chopper arrangement 36, which simultaneously corresponds to the longitudinal axis of the harvesting machine 10 and the direction of the flow of the crop material.

On the walls 54, 56 of the insert 50, that is shown in FIG. 2, slots 66 are provided through which triangular-shaped shear bars 68 can be inserted, secured and later removed. The shear bars 68 are arranged in such a way that they engage in the intervening spaces 72 formed by the flails 64. Since the shear bars 68 are provided with cutting edges 70 on both sides, they may be turned through 180 degrees if necessary and can be inserted on both wall components 54, 56. However, it is also possible to employ shear bars 68 that differ from those described and, for example, are provided with cutting edges on only one side or that are rectangular in shape. In order to assure a simple removal or installation of the shear bars 68, they are mounted on rails, not shown, with which several shear bars 68 can be installed or removed in one working cycle.

If the combine 10 is employed in harvesting, the rotors 44 are rotated in opposite directions by an appropriate drive. Due to the paddle-shaped configuration of the impeller blades 60, the rotors 44 operate as blowers and generate a negative pressure in the interior of the chopper housing 42. Thereby straw that is delivered by the shakers 30 or chaff that is delivered by the sieves 34 is drawn in and conveyed into the straw chopper arrangement 36.

If the straw is in the straw chopper arrangement 36 it is cut between the flails 64 and the shear bars 68. Since both the flails 64 as well as the shear bars 68 are provided with cutting edges 70, the straw is cut into uniform pieces and is not torn. The straw that is now cut is accelerated by the paddle-shaped impeller blades 60 and is ejected through the open rear side 48 of the chopper arrangement 36. Due to the rotation in opposite directions of the rotors 44, preferably directed outward, the chopped straw is ejected to both sides of the harvesting machine 10, which achieves a uniform distribution of the chopped crop.

If no cutting of the straw, but only a deposit of long straw is to be performed, then a simple modification of the chopper arrangement 36 is possible. For this purpose the removable shear bars 68 are removed from the slots 66. The remaining components of the straw chopper arrangement 36 remain unchanged. Since the shear bars 68 have been removed there is no cutting of the straw drawn in. But the paddle-shaped impeller blades 60 of the rotors 44 continue to operate as ejection blades, so that a distribution of the long straw is performed.

The present invention should not be limited to the above described embodiments, but should be limited solely by the claims that follow.

What is claimed is:

1. A straw chopper arrangement for an agricultural harvesting machine, the straw chopper arrangement comprising:

a chopper housing having a wall and a supply side having an opening for receiving crop material, wherein a portion of the crop material is fed into the chopper housing from the side;

a rotor being rotatively mounted in the chopper housing, the rotor defining a circumference, the rotor is provided with a hub and at least one impeller blade extending radially outward from the hub, the impeller blade having a radially outermost end to which are pivotally mounted flails, the flails defining vertically intervening spaces, wherein the portion of ther crop material fed into the chopper housing from the side is fed to the circumference of the rotor;

shear bars are mounted to the wall of the housing and are located in the intervening spaces defined by the flails.

2. A straw chopper as defined by claim 1 wherein the entire supply side of the chopper housing is open.

3. A straw chopper as defined by claim 1 wherein the straw chopper arrangement is provided with two rotors arranged side-by-side.

4. A straw chopper as defined by claim 3 wherein the two rotors rotate in opposite directions to one another.

5. A straw chopper assembly as defined by claim 4 wherein the chopper housing is provided with two walls which are arranged between the rotors.

6. A straw chopper as defined by claim 5 wherein the two walls partially enclose the rotors.

7. A straw chopper as defined by claim 6 wherein the two walls are provided with the shear bars that are located in the intervening spaces defined by the flails.

8. A straw chopper as defined by claim 1 wherein the flails are provided with cutting edges for cutting the crop material entering the straw chopper arrangement.

9. A straw chopper as defined by claim 1 wherein the rotor is provided with at least two impeller blades that are spaced circumferentially around the rotor hub and extending radially outward therefrom, the impeller blades forming a blower when the rotors are rotated.

* * * * *